(12) United States Patent
Monville

(10) Patent No.: US 8,261,421 B2
(45) Date of Patent: Sep. 11, 2012

(54) METHOD FOR SETTING UP AND CONTROLLING A HYDRAULIC TENSIONER FOR APPLYING A PRELOAD ON ONE OR A PLURALITY OF BOLTS

(75) Inventor: Jean-Michel Monville, Les Essarts le Roi (FR)

(73) Assignee: Aktiebolaget SKF, Gothenburg (SE)

( * ) Notice: Subject to any disclaimer, the term of this patent is extended or adjusted under 35 U.S.C. 154(b) by 430 days.

(21) Appl. No.: 12/310,632

(22) PCT Filed: Aug. 20, 2007

(86) PCT No.: PCT/FR2007/051832
§ 371 (c)(1),
(2), (4) Date: Feb. 27, 2009

(87) PCT Pub. No.: WO2008/025922
PCT Pub. Date: Mar. 6, 2008

(65) Prior Publication Data
US 2010/0005663 A1    Jan. 14, 2010

(30) Foreign Application Priority Data
Sep. 1, 2006   (FR) ...................................... 06 07681

(51) Int. Cl.
*F16B 31/04*   (2006.01)
(52) U.S. Cl. ...... 29/446; 29/705; 29/407.01; 29/525.02; 411/14.5; 81/57.38
(58) Field of Classification Search ............... 29/898.09, 29/702, 705, 23, 256–266, 407.01, 407.1, 29/525.01, 525.022, 238, 56–266; 411/14.5, 411/14, 916, 917; 81/57.38
See application file for complete search history.

(56) References Cited

U.S. PATENT DOCUMENTS

| | | | | |
|---|---|---|---|---|
| 3,837,694 A * | 9/1974 | Frisch et al. | ............. | 292/256.75 |
| 3,877,326 A * | 4/1975 | Kock et al. | ................... | 81/57.38 |
| 3,995,828 A * | 12/1976 | Orban | ......................... | 254/29 A |
| 4,047,456 A * | 9/1977 | Scholz | ........................ | 81/57.38 |
| 4,185,504 A * | 1/1980 | Exner et al. | ..................... | 73/761 |
| 4,185,505 A * | 1/1980 | Exner et al. | ..................... | 73/761 |
| 4,185,506 A * | 1/1980 | Exner et al. | ..................... | 73/761 |
| 4,333,351 A * | 6/1982 | Bickford | ......................... | 73/761 |
| 4,604,918 A * | 8/1986 | Aldred | ......................... | 81/57.38 |
| 4,659,065 A * | 4/1987 | Simms | ........................ | 254/29 A |
| 4,773,146 A * | 9/1988 | Bunyan | ...................... | 29/407.02 |
| 4,846,444 A * | 7/1989 | Vassalotti | .................. | 254/29 A |
| 5,257,207 A * | 10/1993 | Warren | ......................... | 702/43 |
| 5,690,456 A * | 11/1997 | Wedellsborg | ................ | 411/383 |
| 6,167,764 B1 * | 1/2001 | Calhoun | ......................... | 73/837 |
| 6,840,726 B2 * | 1/2005 | Gosling | ....................... | 411/14.5 |
| 7,066,699 B2 * | 6/2006 | Gosling | ....................... | 411/14.5 |
| 7,275,462 B2 | 10/2007 | Faus et al. | | |
| 2008/0034925 A1 * | 2/2008 | Hohmann et al. | ........... | 81/57.38 |

FOREIGN PATENT DOCUMENTS

DE            2846668 A        6/1980
(Continued)

*Primary Examiner* — David Bryant
*Assistant Examiner* — Jason L Vaughan
(74) *Attorney, Agent, or Firm* — Mark A. Ussai; Bryan Peckjian

(57) ABSTRACT

A method of establishing and checking the axial preload in a tightening portion (34) of at least one shank of the screw or stud type (4). The establishing of the preload involves a step of tensioning an extension portion (33) of the shank (4) comprising the tightening portion (34) using a shank (4) gripper member (9) and a tensioner (6). The checking method involves a step in which, prior to establishing the preload, the tensioner is brought into a rest configuration and the gripper member (9) is brought into contact with the tensioner (6) in said rest configuration, and a step in which, having established the preload, the tensioner is returned to said rest configuration, and the tensioner in said rest configuration is pressed toward one of the ends of the extension portion (33) and the difference between the initial length (Liθ) and the final length (Lfθ) of the extension portion (33) is compared against a threshold.

11 Claims, 4 Drawing Sheets

FOREIGN PATENT DOCUMENTS

| | | | |
|---|---|---|---|
| DE | 4313778 | A | 11/1994 |
| FR | 2442436 | A | 6/1980 |
| FR | 2495320 | A | 6/1982 |
| FR | 2580742 | A | 10/1986 |
| FR | 2580742 | A1 * | 10/1986 |
| FR | 2586098 | A | 2/1987 |
| FR | 2841304 | A1 | 12/2003 |
| FR | 2871231 | A1 | 12/2005 |

* cited by examiner

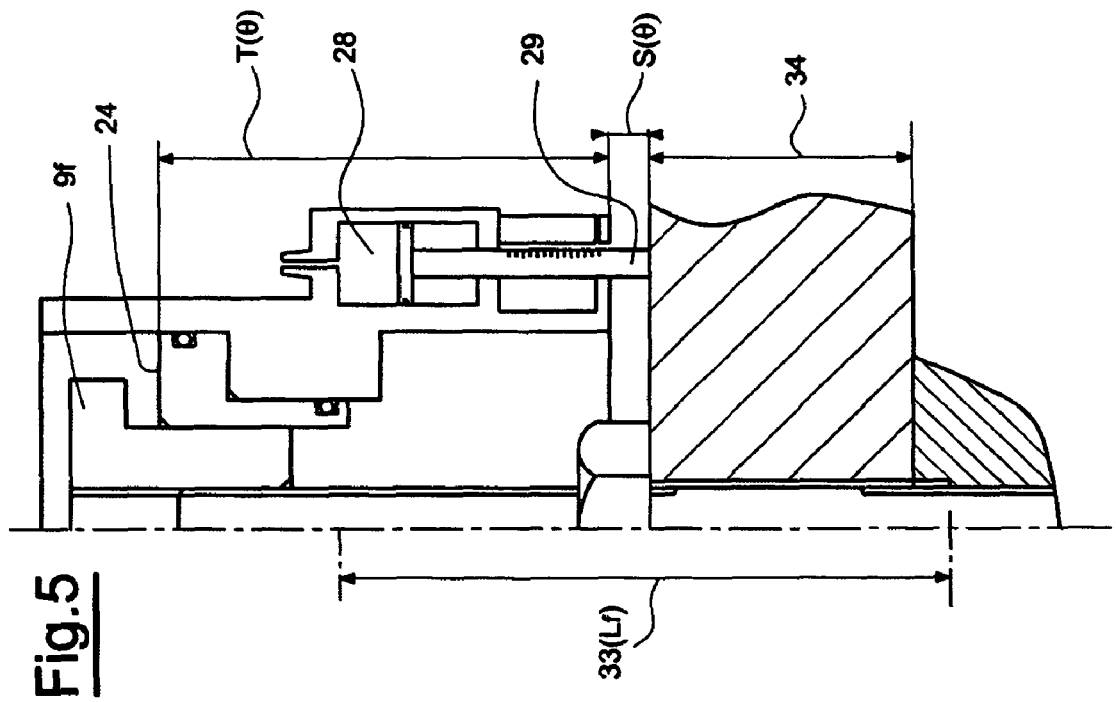
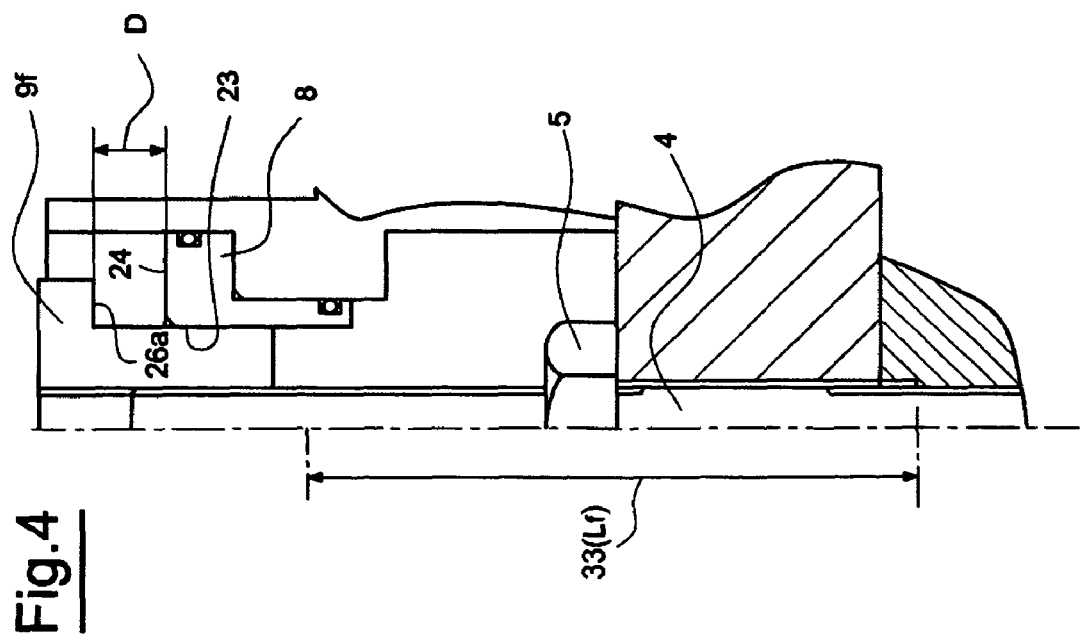

METHOD FOR SETTING UP AND CONTROLLING A HYDRAULIC TENSIONER FOR APPLYING A PRELOAD ON ONE OR A PLURALITY OF BOLTS

BACKGROUND OF THE INVENTION

The invention relates to the field of bolt tightening by cold preload, and in particular relates to a method of checking the preload in the shank of the bolt, at the end of tightening. The invention also relates to a device for implementing a method such as this.

Bolts comprising a shank, of the screw or stud type, and one or more nuts, are used to assemble numerous components of a structure. It is known practice, in order to achieve quality tightening, for a tightening shank to be stretched using a hydraulic ram and for a tightening nut then to be brought into contact with the components that are to be tightened, without applying significant torque, and then for the extensile load on the shank to be released. The released shank tends to return to its at-rest length but, being prevented from doing so by the nut, applies a clamping force to the components that are to be tightened. A preloading method such as this avoids nuts having to be tightened by applying tightening torques to them.

Furthermore, in order to tighten the circular flange, various bolts distributed around the flange that is to be tightened are tightened alternately. Tightening in this way requires a number of tightening steps for each of the bolts. What actually happens is that the tightening of one bolt relieves the stress in the neighboring bolts. The applicant has discovered that the number of steps required to tighten each bolt increases rapidly with the number of bolts distributed around the circular flange that has to be tightened.

By way of an example of the tightening of a number of bolts, mention may be made of the case of rolling bearings measuring several hundredths of millimeters or even several meters in diameter, which are needed for attaching wind generator blades to a central hub of the rotary of the wind generator or for attaching the directional electric generator equipped with the wind generator rotor to the top of the stationary mast. One of the rings of these enormous rolling bearings is generally factory-fitted onto part of the equipment, the other ring being connected to a circular tightening flange of the same size. This tightening flange may be assembled with the rotating part of the equipment on the site on which the wind generator is ultimately assembled. Attaching just one of these flanges may require in the order of one hundred bolts.

Unwanted loosening of just one of the numerous bolts has a knock-on effect on the other bolts and carries the risk of causing warping and loadings of the flange, causing other bolts to exceed their elastic limit. This may, through a domino effect, lead to deterioration of the entire fastening. Often, given uncertainties regarding tightening, particularly when it is tightening to torque that is being employed, the bolts and nuts are over engineered. This does not improve the accuracy of the tightening but it does increase the dimensions and mass of the assembly, which is particularly penalizing in the case of equipment that has to be assembled at a great height.

Document FR 2 841 304 (SKF) describes a device comprising an annular plate equipped with a plurality of circumferentially distributed hydraulic devices. This device allows global tightening of a plurality of threaded shanks distributed around a circular flange, for example. Tension is simultaneously applied to all the threaded shanks, tightening nuts are brought into contact on each of the shanks with the component that is to be tightened then the tensions are simultaneously released. Simultaneous tensioning is particularly beneficial for tightening circular flanges in which the number of bolts to be tightened is very high. Simultaneous tensioning of the bolts avoids the alternate tightening of each of the bolts in multiple stages. The disadvantage with such a method is that the tension that remains in each bolt following the simultaneous release of the shanks is dependent on the positioning of the tightening nut. If one of the tightening nuts has not been positioned correctly in contact with the flange that is to be tightened while the shank was stretched, the tension in the tightened part of the bolt may be very low, even though the extensile tension was checked and the nut appeared to be tight. It is therefore necessary to have a means of checking the tightening obtained.

Document FR 2 871 231 (SKF) describes a method of checking the residual tension in a working part of a shank of the screw or stud type delimited by a nut. This check is performed after the shank has been tensioned, by axial stretching, the nut has been fitted and the shank has been released. This method of checking consists in measuring the elongation of the shank as a function of the extensile force. The disadvantage with this method of checking is that it is individual for each given bolt and that the shank has to be re-tensioned specifically for the purpose of the checking operation.

That document also mentions another method of checking that uses gauged bolts to determine the residual elongation of the shank of the bolt after release. A reference gauging rod is positioned in an axial passage machined in the center of the bolt that is to be checked. In this method, the difference in position between the top of the gauging rod and the top of the bolt is compared before and after tightening using a feeler. This method is expensive, is restricted to individual checking of shanks, and usually entails removing the tensioning device in order to perform the checking step. Another method is to position an ultrasound probe on the bolt shank before and after the preloading. That method requires specialist operators and has to be applied to each bolt. That is expensive. Another method is to fit the bolts with a sensor washer capable of measuring the load in the bolt. This checking means remains permanently fitted to the bolt that is to be checked.

Document DE 28 46 668 describes an elongation measurement instrument for a stud tightening device. The stud has an axial bore through which a gauging rod passes. The gauging rod butts via its end against a nut fixed in the lower part of the stud. An elongation measurement instrument is positioned at the top of the gauging rod and bears against the top face of the stud. A method such as this for checking the preload has the disadvantage of requiring special purpose studs that have to be fitted with a gauging rod passing through them. That reduces the working cross section of the stud or studs. It is desirable to be able to check the preload established in one or more standard studs.

SUMMARY OF THE INVENTION

The invention proposes a method and a device for establishing and checking the tightening preload of at least one shank which overcomes at least one of the aforementioned problems.

One object of the invention is to allow a rapid check and to ensure that any standard shanks that are insufficiently preloaded are detected.

The checking method and device of the invention are aimed in particular at checking the preload in standard shanks or studs or at avoiding having to retension the shank specifically for the purposes of checking it, or of having to remove the preloading device, or of having to resort to an expensive checking means once the preload has been established.

When implemented on several shanks that are to be checked the checking method and device of the invention aim to be compatible with a method of simultaneously establishing the preload in bolt shanks and checking all the shanks globally.

According to one embodiment, the invention relates to a method of establishing and checking the axial preload in a tightening portion of at least one shank of the screw or stud type. The establishing of the preload involves a step of tensioning an extension portion of the shank comprising the tightening portion using a shank gripper member and a tensioner. The checking method involves a step in which, prior to establishing the preload, the tensioner is brought into a rest configuration and the gripper member is brought into contact with the tensioner in said rest configuration, and a step in which, having established the preload, the tensioner is returned to said rest configuration, the tensioner in said rest configuration is pressed toward one of the ends of the extension portion and the difference between the initial length and the final length of the extension portion is compared against a threshold.

The tension preload is established for example using hydraulic tensioning. In general, for checking the preload in the shank, use is made of the members that are needed for establishing the preload that is to be checked. Thanks to the initial step of bringing the gripper means into contact, the rest configuration of the tensioner acts as a control, once the preload has been established, indicating the initial length of the extension portion, because the ends of the extension portion are connected to the tensioner by a sequence of load transmitting members which, thanks to the contact, contains no initial play. Once the preload has been established, the gripper member remains fixed at the same spot on the shank that is to be checked. Because of the preload in the tightening portion, the extension portion is lengthened. On returning to the rest configuration, a clearance is introduced into the sequence of load transmission members. Thanks to the step during which the tensioner was applied at rest, this clearance appears at just one point for each shank that is to be checked. This clearance is directly representative of the tightening stress. Thanks to the use, for checking the preload, of the members that were used to establish this preload, the phases of establishing the preload and of checking it are highly integrated. The checking time is short and checking can take place at any moment after the preload has been established. There is no need to remove the preloading means, and this means that, if the result of the check reveals that one shank is insufficiently preloaded, it is possible for this preloading to be performed again and rechecked. There is no need to resort to checking means that are complicated to use such as ultrasound probes or to expensive means such as gauged bolts.

Advantageously, the difference between the final length and the initial length of the extension portion of each shank is measured. The fact that the difference in length experienced by each extension portion of the shanks is measured reveals the value of the axial preload and identifies whether a particular shank has been insufficiently or excessively preloaded.

According to an alternative form, the method is intended for checking at least two shanks each having a tightening portion of the same length, in which method the shank that exhibits the smallest difference between the final length and the corresponding initial length is identified in order to identify which shank has the minimum preload. That allows an operator to go and examine one shank in greater detail in order to detect an anomaly therein.

According to another alternative form, the method is intended for checking the tightening preload of at least three parallel shanks comprising tightening portions of the same length. The establishing of the preload employs shank gripper members located at one of the ends of the extension portions of the shanks, the relative positions of the other ends of the extension portions being unchanged by the establishing of the preload. The checking method involves a step in which, prior to establishing the preload, the gripper members are brought into contact with a reference surface of the tensioner in the initial position and a step in which, once the preload has been established, the reference surface is pressed firmly into a final position against at least three of the gripper members and the distance between the initial position and the final position of the reference surface is measured at at least three measurement points. This alternative form has the advantage that all the shanks can be checked globally in a single sequence. Using a set of three sensors, for example, it is possible to check the elongation of a multitude of simultaneously tightened stubs. This is particularly advantageous in the case of flanged tightenings which employ numerous bolts.

Advantageously, a minimal difference between the final length and the initial length of the extension portion of the shank is calculated for each shank as a function of the distances measured.

According to another aspect of the invention, this invention relates to a device for establishing and checking the axial preload of at least one shank when tightening a component. The device comprises, for the shank that is to be checked, a gripper member located on the shank and a tensioner equipped with a body and with a piston. The tensioner comprises a bearing surface via which the piston bears against a complementary surface of the gripper member and a bearing surface via which the tensioner body bears against a complementary surface of the component that is to be tightened; said tensioner having a rest configuration in which the bearing surfaces are fixed relative to one another and intended, when not in the rest configuration, to apply tension to the shank. The device comprises a pressing means for pressing one of the bearing surfaces of the tensioner against the corresponding complementary surface and a comparison means for comparing the distance between the other bearing surface of the tensioner at rest and the corresponding complementary surface, against a threshold.

The fact that the bearing surfaces of the tensioner are able, when not in the rest configuration, to tension the shank, means that the tensioner in the rest configuration can be made to coincide with an initial configuration prior to the establishing of the preload in the shank. Once the preload has been established, the return of the tensioner to its rest configuration provides a concrete embodiment of the initial configuration. The difference between the initial distance between the two complementary surfaces and the final distance corresponds to the elongation of the shank. This elongation is due to that part of the shank that has been subjected to a tightening preload. The means of pressing the tensioner allows the final length between the two complementary surfaces to be measured. The comparison means compares the difference between the final and initial lengths separating the two complementary surfaces against a threshold that represents insufficient elongation. The fact that the components used to sense the final length of the extension portion are also used to establish the preload means that the check can be performed without the need to remove the components used for tensioning. The pressing means may, for example, consist of pneumatic rams or spring-loaded devices and the comparison means may consist of inductive or potentiometric displacement sensors. The pressing means is chosen according to the loadings involved so that its action will introduce only infinitesimally small deformations. The precision of the measurement means is determined according to the precision required for measuring the preload in the bolt shanks.

Advantageously, the pressing means is capable of pressing one of the bearing surfaces of the tensioner against the corresponding complementary surface, while at the same time keeping the gripper member fixed with respect to the shanks.

Advantageously, the tensioner comprises a hydraulic ram. That has the advantage for checking in that only a minimal preload needs to be verified. Specifically, for a given oil pressure and a known ram geometry, the maximum tensile load is known. Random unknowns, such as friction or misalignment of components can do nothing more than lessen the preload established in the shank.

According to an alternative form, the device is intended for the simultaneous checking of the tightening preload of a plurality of parallel shanks on tightening portions of the same length. The device comprises a tensioner body common to the shanks that are to be checked, and a plurality of pistons corresponding to the shanks. The measurement means is capable of measuring the distance between the bearing surface of the body of the tensioner and the component that is to be tightened, at at least three measurement points.

Advantageously, the device comprises a calculation means capable of locating the least tensioned shank as a function of the at least three distances measured.

Advantageously, the tensioner has one rest configuration in which the pistons corresponding to the shanks that are to be checked are immobilized by internal limit stops of the tensioner body, a reference surface of the tensioner being defined by the plurality of bearing surfaces of the pistons at rest; the gripper members of the shanks that are to be checked being intended to be brought into contact, before the preload is established, with the reference surface of the tensioner; the pressing means being capable, once the preload has been established, of pressing the reference surface of the tensioner firmly against at least three contact gripper members.

According to another alternative form, the tensioner body is of annular overall shape and in which the shanks to be checked are distributed around a circle and are parallel to the axis of the annular shape. This type of device is particular advantageous for checking the tightening of circular flanges.

Advantageously, the bearing surface via which the tensioner body bears against the component is in the overall shape of a ring; the pressing means bearing against the component that is to be tightened and being capable of moving the annular body of the tensioner at three support points distributed about the ring. This type of device benefits from the fact that the probability of there being two insufficiently preloaded shanks at two widely spaced locations on the ring is far lower than the probability of there being just one insufficiently preloaded shank, even when there is a high number of bolts. Thus, when measuring, there is a far greater chance that any observed slanting of the ring in any given direction is due from there being one insufficiently preloaded bolt in said direction than several bolts which together are causing said inclination. When this inclination is the result of a number of insufficiently tightened bolts the method of the invention is capable of finding the bolts concerned it merely takes a little longer than when the cause is just one bolt.

BRIEF DESCRIPTION OF THE SEVERAL VIEWS OF THE DRAWINGS

Further features and advantages of the invention will become apparent from reading the detailed description of a number of embodiments of the device taken by way of non-limiting examples and illustrated by the attached drawings in which:

FIG. 4 is a half section of the device after release of the shank;

FIG. 5 is a half section of the device after the tensioner has been pressed against the gripper members;

DETAILED DESCRIPTION OF THE INVENTION

Figure 1:
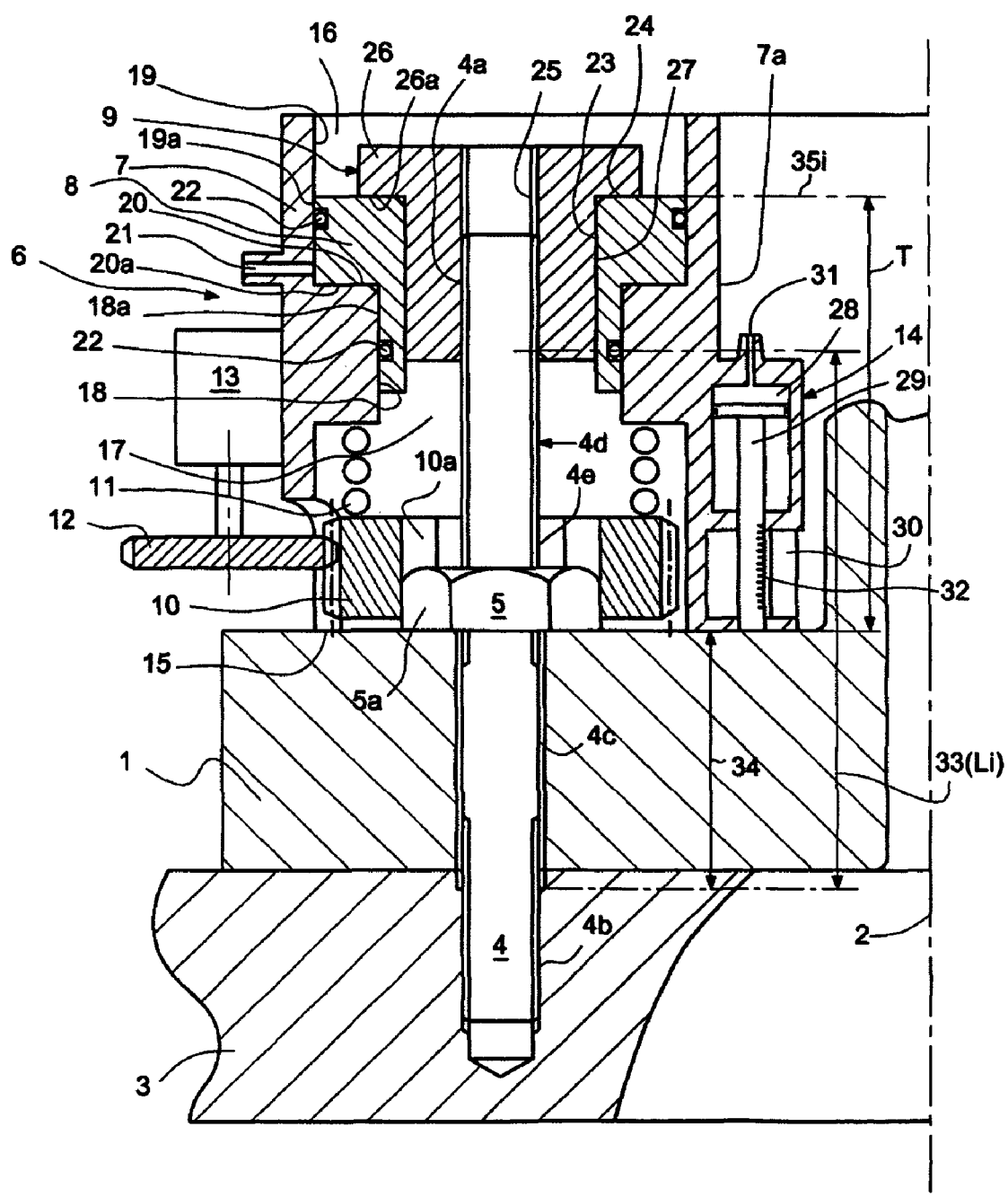
FIG. 1 is a cross section, on the plane I-I of FIG. 6, of a device used to preload and to check the preload of a shank used to tighten a circular flange. This section illustrates the device in the rest configuration corresponding to an initial configuration prior to the establishment of the preload in the shank.

As demonstrated in FIG. 1, a circular flange 1 of axis 2 is attached to a stand 3 by a plurality of studs 4 just one of which is depicted in FIG. 1, and by tightening nuts 5 corresponding to each stud 4. A tensioner 6 comprises a tensioner body 7 and as many pistons 8 as there are studs 4 to be tightened.

In an alternative form, the tensioner 6 is a rigid assembly comprising as many individual tensioners as there are studs to be tightened. Each individual tensioner comprises one cylinder and one piston 8.

The device for checking and establishing the preload also comprises a gripper means 9 for each of the studs 4 that is to be tightened, as well as, for each hexagonal tightening nut 5, a placement wheel 10 pressed firmly against the tightening nut 5 by a spring 11 and driven by a drive wheel 12 and a placement motor 13. The device also comprises a pressing and measurement means 14.

The tensioner body 7 is of annular shape on the same axis 2 as the circular flange 1 that is to be tightened, and rests against the circular flange 1 via a bearing surface 15 that has the overall shape of a ring. The tensioner body 7 comprises a plurality of housings 16 each axisymmetric in shape about an axis intended to coincide with the axis of the shanks of each of the studs 4 and perpendicular to the bearing surface 15. The housings 16 comprise, along their axis, a proximal cavity 17 situated axially close to the bearing surface 15, followed by a bore 18 situated axially in a central portion and a bore 19 situated axially in a distal portion of the tensioner body 7, concentric with the bore 18 and connecting to the bore 18 via a shoulder 20. The bore 19 has a greater diameter than the bore 18. The tensioner body 7 also comprises a radial passage 21 opening into the housing 16 near the shoulder 20.

The piston 8 has two outside diameters 18a and 19a matched to the bores 18 and 19, and a shoulder 20a corresponding to the shoulder 20. The outside diameters 18a and 19a have grooves fitted with sealing rings 22 situated axially on each side of the passage 21 intended to receive pressurized oil. Each piston 8 has an internal bore 23 and an axial bearing surface 24.

The gripper means 9 has an internal screw thread 25 that corresponds to the screw thread of a distal part 4a of the stud 4. The gripper means 9 also comprises a rim 26 extending radially in such a way as to rest against the bearing surface 24 via a complementary surface 26a of the rim 26. The gripper member 9 also comprises a guide diameter 27 intended to collaborate with the bore 23 of the piston 8.

The device comprises at least three pressing and measurement means 14 situated on an interior side wall 7a of the tensioner body 7 and spaced equal distances apart around the ring that the tensioner body 7 (visible in FIG. 6) forms. The means 14, illustrated in FIG. 1, comprises a cavity 28, a piston 29 and an optical reader device 30. The cavity is connected to a pneumatic passage by a duct 31 opening into the cavity 28. The piston 29 is equipped, in a part that projects from the cavity 28, with engraved patterns 32 that can be detected via the optical reader device 30. As an alternative, the measurement means may comprise dial-type analog comparators. These comparators are inexpensive, do not have to be connected to a calculation means and are suitable for a low number of bolts to be checked.

The stud 4 has a base screw thread 4b intended to be screwed forcibly into the stand 3, a plain part 4c that passes through the circular flange 1 and a second screw thread 4d comprising a proximal part 4e close to the bearing surface of the body 15 and intended to accept the tightening nut 5 and the distal part 4a intended to accept the gripper means 9.

In an alternative form, the tightening nut 5 is of cylindrical shape equipped, for example, with six radial holes. An operator slips into one of the radial holes an end hook of a set-torque torque wrench and tightens the tightening nut 5 over one sixth of a turn and looks for the next radial hole and so on until the set torque is reached. The wrench allows the nut 5 to be brought into contact repeatably without thereby introducing torsional stress into the shank 4. As an alternative, the cylindrical nut may be equipped with teeth or notches so that it can be turned into contact in a motorized manner.

In an alternative form, the pressing means is incorporated into the body 7 of the tensioner 6. The measurement means 30 of an inductive type for example, is separate from the pressing means.

The way in which the device that preloads the stud 4 and checks the preload works will now be described with the aid of FIGS. 1 to 5. In successive step order the plurality of studs 4 is forcibly screwed into the stand 3, the circular flange 1 is slipped over the studs 4 until it comes into contact with the stand 3, the tightening nut 5 is screwed onto the proximal part 4e of the stud 4, the tensioner 6 is slipped around the flange 1, so that the pistons 8 accept the studs 4. The device is then brought into an initial configuration (FIG. 1) in which the tensioner 6 is brought into a rest configuration in which all the shoulders 20a of each of the pistons 8 are in contact with the shoulder 20 of the tensioner body 7. Each of the gripper members 9 is screwed onto the distal part of the corresponding stud 4 until the rim 26 comes into contact with the bearing surface 24 of the corresponding piston 8.

The piston 29 of each of the pressing and measurement means 14 is brought into a retracted position in which it is retracted inside the cavity 28 so that it does not project from the bearing surface 15 of the tensioner body 7 which then rests against the circular flange 1. In this initial configuration, the bearing surfaces 15 and 24 of the tensioner 6 are in contact with the corresponding complementary surfaces and none of the studs 4 is subjected to axial stress. The stud 4 then has an extension portion 33 intended to be stretched, extending to a first approximation from the gripper means 9 as far as the stand 3. In this initial configuration, the extension portion 33 has an initial length "Li".

Figure 2:
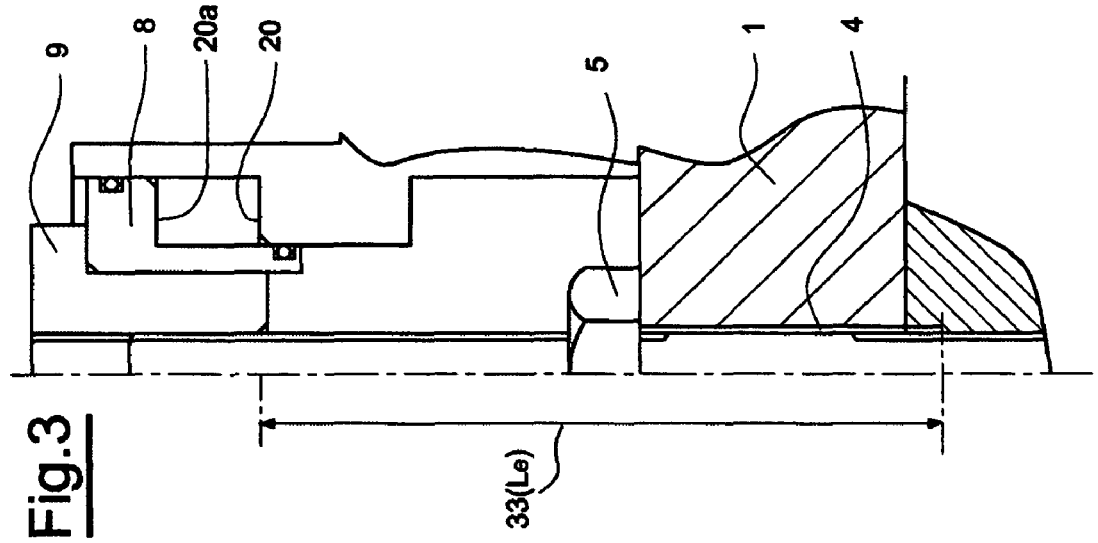
FIG. 2 is a half section of the device in the stretch configuration.
Figure 3:
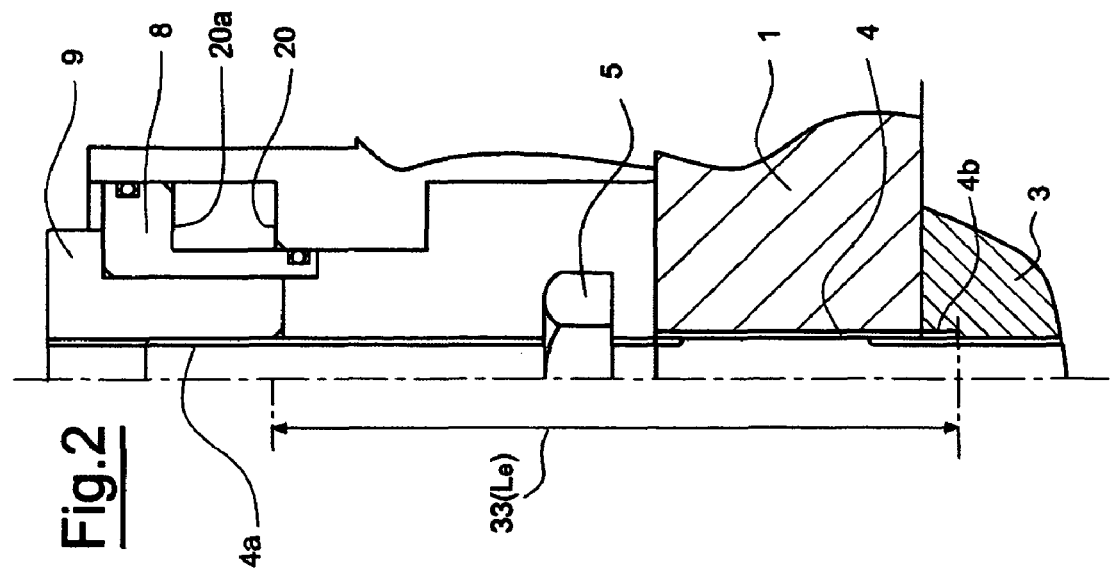
FIG. 3 is a half section of the device after fitment of the tightening nut.

As illustrated in FIG. 2, pressurized oil is then introduced through each of the passages 21 between the shoulders 20 and 20a of each of the pistons. Thanks to the seals 22, the piston 8 moves away from the bearing plane 15 of the tensioner body 7 and at the same time lifts the gripper means 9. The tensile force to which the stud 4 is subjected is substantially constant between the two threaded ends 4a and 4b. The axial stress to which the material of the stud 4 is subjected decreases gradually inside the distal part along the first threads of the screw thread 25. The same is true of the axial stress experienced by the base screw thread 4b of the stud 4. The stress decreases gradually right from the first threads of the stand 3. The extension portion 33 has an extended length "Le".

The placement motor 13 illustrated in FIG. 1 turns the drive wheel 12 which meshes with a tooth set of the placement wheel 10. The placement wheel 10 pivots about the axis of the stud 4 until a hexagonal housing 10a angularly coincides with six complementary flaps 5a of the tightening nut 5. The spring 11 pushes the placement wheel 10, which fits over the tightening nut 5. Teeth belonging to the drive wheel 12 slide along complementary teeth of the placement wheel 10. The torque applied by the placement motor 13 turns the tightening nut 5 until it comes into contact with the circular flange 1. The motor 13 is, for example, an electric motor such that when the tightening nut 5 comes into contact with the circular flange 1, the friction between the nut and the flange 1 and the screw thread 4d of the stud 4 suddenly increases as does the electric current drawn by the motor 13. A switching device interrupts the drive of the motor 13 as soon as the tightening nut 5 has come into contact with the flange 1. The driving motor 13 does not therefore significantly increase the tension in the stud 4. The motor 13 allows the tightening nut 5 to be positioned repeatably in contact with the flange 1 while the stud 4 is being tensioned over its entire extension portion 33 under the effect of the pressurized hydraulic oil (see FIG. 3).

The hydraulic pressure is then released (see FIG. 4) and each of the pistons 8 of the tensioner 6 returns to its initial position, immobilized by contact between the shoulder 20a of the piston 8 and the corresponding shoulder 20 of the tensioner body 7. The gripper means 9 remains fixed to the distal part 4a of the stud 4, slides in the bore 23 of the corresponding piston 8 and adopts a final position "9f". That part of the stud 4 that lies between the tightening nut 5 and the gripper means 9 is relaxed, whereas the part 4c of the stud 4 that passes through the circular flange 1 is held in the tensioned state by the tightening nut 5. The extension portion 33 has a final length "Lf" after release, which is shorter than the extended length "Le". This final length of the extension portion 33 is nonetheless longer than the initial length "Li" of this same extension portion 33 because a tightening portion 34 contained between the tightening nut 5 and the stand 3 remains in a tensioned state. If the bearing surface 15 of the tensioner 6 remains in contact with the stand 3, then the distance between the bearing surface 24 of the piston 8 and the complementary surface 26a of the gripper means 9 is equal to the elongation that the tightening portion 34 has undergone during the tensioning operation.

In an alternative form, the elongation of the tightening portion 34 of a given stud may be measured directly by a sensor, providing information as to the residual axial preload in the tightening portion 34. This alternative form does necessitate a measurement means or a measurement operation for each of the studs.

Depending on the shape of the flange 1 and of the tensioner body 7, it may be that the compression of the flange 1 by the nut 5 deforms the surface of the flange 1 against which the bearing surface 15 of the tensioner body 7 rests. If this happens then the distance between the bearing surface 24 of the piston 8 and the complementary surface 26a of the gripper means 9 includes the deformation of the flange 1 that has become compressed at the location of the tensioner 7. However, this potential deformation of the flange 1, together with any deformation of the tightened structure, is generally of a secondary order as compared with the elongation of the shank 4. In addition, these deformations are known precisely, either by calculation or by initial experimentation. If the total extent of these deformations is deemed to be significant then this value can be systematically deducted from the measurements taken so as to measure the actual elongation of the tightening portion 34 of the shank 4.

Figure 6:
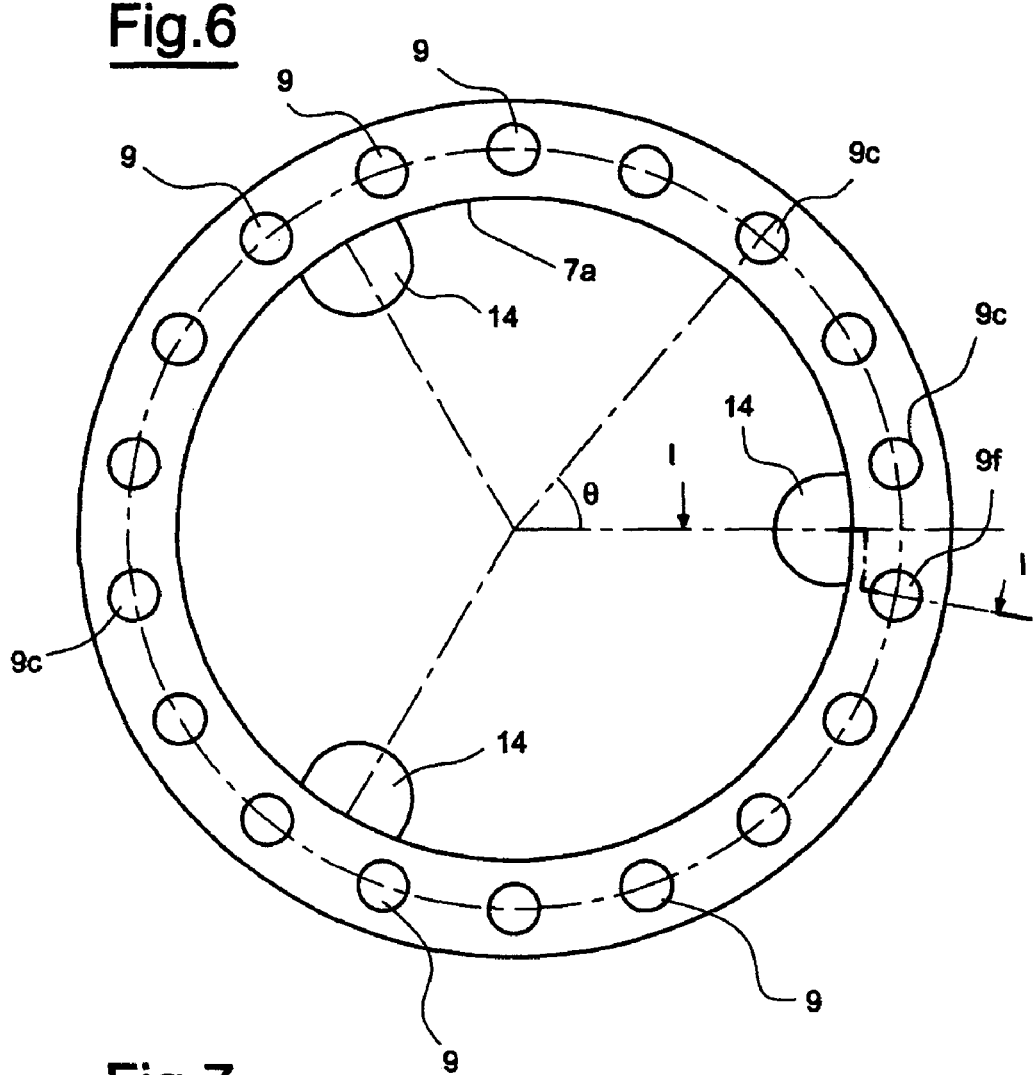
FIG. 6 is a view of the device from above.

As illustrated in FIGS. 5 and 6, pressurized air is introduced into the cavity 28 in order to drive the piston 29 in order to press the tensioner assembly firmly upwards in FIG. 5.

The flange 1 has a constant thickness which means that that the lengths "LS" of the tightening portions 34 of each of the studs 4 are substantially identical. By contrast, the distance "T$\theta$" separating the bearing surface 15 from each of the bearing surfaces 24 of the pistons 8 bearing against the shoulder 20 may vary according to the angular position $\theta$ of the stud shank 4 considered, without that affecting the precision of the check. The initial length "Li$\theta$" of the extension portion 33 of a given stud is equal to the sum of the length "LS" of the tightening portion 34 of this stud, plus the distance "T$\theta$". Li$\theta$=LS+T$\theta$.

The distance "T$\theta$" is a distance measured in the rest configuration. It is identical in the initial rest configuration prior to tensioning, and in the final rest configuration once the nut 5 has been placed and said shank has been released. All of the bearing surfaces 24 of each of the pistons 8 at rest lie on an imaginary reference surface 35 that is fixed with respect to the tensioner 6. Under the effect of the three pressing means 14, the reference surface 35 shifts with the tensioner 6.

Figure 7:
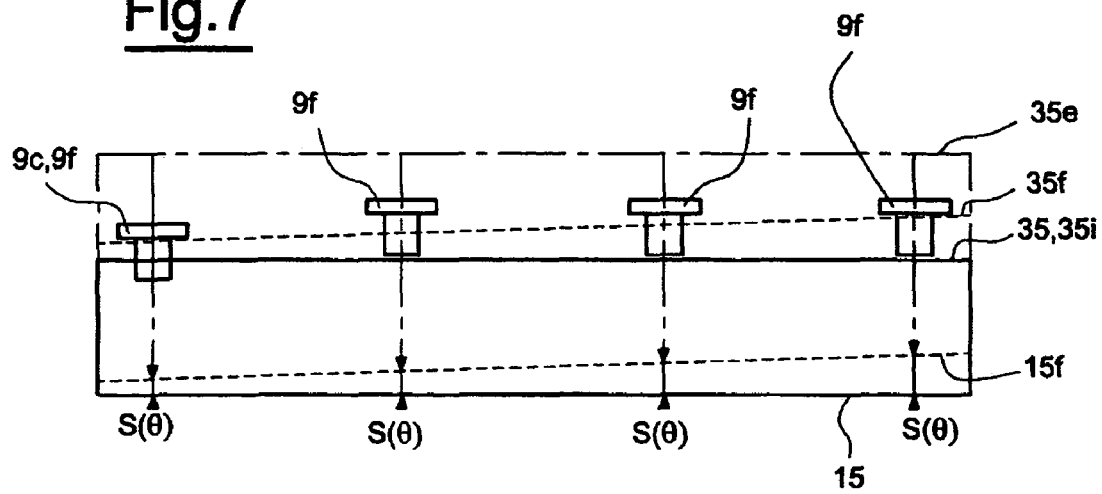
FIG. 7 is a schematic depiction of the movements of the bearing surface of the tensioner body and of the reference surface of the tensioner during the global operations of checking and preloading the plurality of shanks.

FIG. 7 illustrates the movement of the bearing surface 15 and of the reference surface 35 during the phases of preloading and global checking of all the stud shanks 4. In the initial configuration, the surface 15 bears against the flange 1 and the surface 35 is in an initial position 35$i$. When the stud shanks 4 are tensioned, the surface 35 shifts into a position 35$e$ parallel to the surface 15. Once the tightening nuts 5 not depicted in FIG. 7 have been placed and the stud shanks 4 have been released, the grip members 9 are in a final position 9$f$ and the surface 35 returns to the initial position 35$i$. Under the action of the three pneumatic pistons 29, the surface 15 is raised into a position 15$f$ and the surface 35 adopts a pressing position 35$f$ in which at least three surfaces 24 of the pistons 8 are in contact with three contact nuts 9$c$ out of the nuts that are in their final position 9$f$.

On the basis of the three displacements of the three pistons 29, a computer, not depicted, calculates the distance S$\theta$ through which the surface 15$i$ and the surface 15$f$ are raised at the site of each position $\theta$ of the stud shanks 4. For studs of angular position $\theta$ corresponding to the contact gripper members 9$c$, the final length "Lf$\theta$" of the extension portion 33 is equal to the sum of the length LS of the tightening portion plus the fixed distance T$\theta$ of the tensioner 6, plus the calculated raised distance S$\theta$. In the case of the shanks corresponding to gripper members the final position 9$f$ of which is not in contact with one of the tensioner pistons 8, the final length "Lf$\theta$" is greater than the above sum. For all these stud shanks, we can write Lf$_\theta$≧LS+T$_\theta$+S$_\theta$, hence Lf$_\theta$−Li$_\theta$≧S$_\theta$.

The checking device and method make it possible, with just three measurements, to determine a minimal extension experienced by each of the stud shanks 4. If this extension is insufficient, then the operator can repeat a tensioning cycle, re-establish nut contact and recheck. In addition, the operator knows the angular position at which the potentially insufficiently tightened shank is located and can look out for any anomaly.

In an alternative form, the device has more than three pressing and measurement means 14. That allows the calculation means to determine a number of possible S$\theta$ values and calculates the mean thereof. If the number of measurement means 14 is sufficient then it is possible to dispense with a computer. The shank liable to be insufficiently tensioned then lies in the vicinity of the measurement means 14 that corresponds to the shortest measured lift distance.

In another alternative form, the pressing means 28, 29 are dissociated from the measurement means 29, 30.

There may, for example, be three pressing means and eight measurement means.

The advantage of a pneumatic pressing means is that its actuation can be interrupted and that the forces involved are still low by comparison with the forces needed by the hydraulic rams to tension the shanks. However, any actuator is suitable, such as a base driven by an electric motor or a spring with a setting and releasing device. It is also possible to use hydraulic rams. The choice of any particular pressing or measurement means will be dependent in particular on the size of the flange 1 to be tightened and, especially, on whether the axis 2 is positioned horizontally or vertically. If the distal parts 4$a$ of the studs 4 are directed downward, gravity may be enough to press the tensioner at rest against the gripper members in the final position 9$f$. By contrast, a means of pressing the surface 15 of the tensioner body 7 against the flange 1 may be needed in order to ensure that the gripper members 9 are initially in contact with the tensioner pistons 8 at rest.

In another alternative form, the component to be tightened is an assembly made up of a flange and of a stand clamped between a screw head and a tightening nut 5.

One of the advantages of the invention is that the measurement precision is independent of the quality of the initial contact between the gripper members 9 and the pistons 8 in the rest position.

Another advantage of the invention is that the difference been the initial length and the measured final length is directly representative of the degree of tension in the tightening portion, and that this is true irrespective of the flexibility of the retainer means such as the tightening nut 5, the screw threads 4$b$ of the stud in the stand or of the screw head.

The distances S$\theta$ corresponding to each stud shank 4 can be measured or calculated between the surface 15$f$ in the final position and the surface 15 in the initial position or alternatively between the surface 35$f$ in the final position and the surface 35$i$ in the initial position. Because the stiffness of the gripper members greatly exceeds that of the stud shank 4, the difference in length S$\theta$ also corresponds to the shift between the initial and final configurations of the mobile end 4$a$ of the extension portion 33 of each of the stud shanks 4.

The invention claimed is:
1. A method of establishing and checking the axial preload in a tightening portion of at least one shank of the screw or stud type, the method comprising the steps of:
   providing a shank, a shank gripper member and a tensioner;
      wherein the shank includes a tightening portion and an extension portion;
      wherein the tensioner includes a tensioner body and at least three pressing and measurement means;
      wherein the tensioner body forms a ring;

wherein the at least three pressing and measurement means include a cavity, a piston and an optical reader device within each pressing and measurement means;

wherein the at least three pressing and measurement means are disposed on an interior side wall of the tensioner body and wherein the at least three pressing and measurement means are spaced equal distances apart around the ring formed by the tensioner body;

disposing the tensioner in a rest configuration and bringing the shank gripper member into contact with the tensioner in said rest configuration prior to establishing the preload;

tensioning the extension portion of the shank having the tightening portion using the shank gripper member and the tensioner to establish a preload;

returning the tensioner to said rest configuration after establishing the preload, the tensioner in said rest configuration being pressed toward one end of the extension portion; and comparing a difference between an initial length and a final length of the extension portion with a threshold.

2. The method as claimed in claim 1 wherein:

the step of tensioning an extension portion includes tensioning at least two shanks each having a tightening portion of the same length and the step of comparing the difference between initial and final lengths includes separately comparing the initial and final lengths of each of the at least two shanks; and further comprising the step of identifying the one of the at least two shanks that exhibits the smallest difference between the final length and the corresponding initial length in order to identify which shank has the minimum preload.

3. The method as claimed claim 1, wherein the at least one shank includes at least three parallel shanks, each shank having a tightening portion of the same length as the tightening portion of each other shank, and the step of establishing the preload includes employing a plurality of shank gripper members each located at one of the ends of the extension portion of a separate one of the shanks, the relative position of the other end of each extension portion being unchanged by establishing of the preload, and further comprising the step of bringing each gripper member into contact with a reference surface of the tensioner in the initial position prior to establishing the preload, such that once the preload has been established, the reference surface is pressed firmly into a final position against the three gripper members and the distance between the initial position and the final position of the reference surface is measured at at least three measurement points.

4. The method as claimed in claim 3, in which a minimal difference between the final length and the initial length of the extension portion of the shank is calculated for each one of the three shanks as a function of the distances measured.

5. The method of establishing and checking the axial preload according to claim 1, further comprising pressing a placement wheel firmly against a tightening nut with a spring.

6. The method of establishing and checking the axial preload according to claim 5, further comprising driving the tightening nut with a drive wheel and a placement motor.

7. The method of establishing and checking the axial preload according to claim 1, further comprising connecting the cavity to a pneumatic passage by a duct opening into the cavity.

8. The method of establishing and checking the axial preload according to claim 1, further comprising detecting with the optical reader, engraved patterns on a portion of the piston that projects from the cavity.

9. The method of establishing and checking the axial preload according to claim 5, further comprising interrupting the placement motor with a switching device as soon as the tightening nut comes into contact with a circular flange.

10. The method of establishing and checking the axial preload according to claim 1, further comprising the measurement means being an inductive type and separate from the pressing means.

11. The method of establishing and checking the axial preload according to claim 6, further comprising turning the drive wheel with the placement motor, which meshes with a set of teeth disposed on the placement wheel.

* * * * *